United States Patent
DiVerdi

(10) Patent No.: US 8,379,047 B1
(45) Date of Patent: Feb. 19, 2013

(54) SYSTEM AND METHOD FOR CREATING STROKE-LEVEL EFFECTS IN BRISTLE BRUSH SIMULATIONS USING PER-BRISTLE OPACITY

(75) Inventor: Stephen J. DiVerdi, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 480 days.

(21) Appl. No.: 12/790,560

(22) Filed: May 28, 2010

(51) Int. Cl.
G09G 1/14 (2006.01)
G09G 5/00 (2006.01)
G09G 5/02 (2006.01)

(52) U.S. Cl. ........ 345/592; 345/589; 345/619; 345/156; 345/548; 345/20; 382/313

(58) Field of Classification Search .................. 345/418, 345/581, 589, 592, 600–601, 606, 619, 632–633, 345/156, 173, 176, 179–182, 636, 646–650, 345/652–654, 659, 548–549, 13, 16–17, 345/20; 703/2, 6, 9; 430/6–9, 13, 16; 382/162–163, 382/274, 276, 282–283, 302, 311, 312, 313–315; 178/19.01
See application file for complete search history.

(56) References Cited

U.S. PATENT DOCUMENTS

| | | | | |
|---|---|---|---|---|
| 6,329,990 B1* | 12/2001 | Silverbrook et al. | ......... | 345/589 |
| 6,590,573 B1* | 7/2003 | Geshwind | ..................... | 345/419 |
| 6,870,550 B1* | 3/2005 | Schuster et al. | .............. | 345/639 |
| 8,219,370 B1* | 7/2012 | DiVerdi et al. | .................... | 703/9 |
| 2004/0153204 A1* | 8/2004 | Blanco | ........................... | 700/207 |
| 2005/0001854 A1* | 1/2005 | Schuster et al. | .............. | 345/639 |
| 2007/0216684 A1 | 9/2007 | Hsu | | |
| 2007/0268304 A1 | 11/2007 | Hsu | | |
| 2011/0181618 A1* | 7/2011 | DiVerdi et al. | ................ | 345/620 |

OTHER PUBLICATIONS

William Valentine Baxter III. Physically-based Modeling Techniques for Interactive Digital Painting. PhD thesis, University of North Carolina, 2004.

* cited by examiner

*Primary Examiner* — Wesner Sajous
(74) *Attorney, Agent, or Firm* — Wolfe SBMC

(57) ABSTRACT

A method, system, and computer-readable storage medium are disclosed for simulating bristle brush behavior in an image editing application. User input may represent a stroke made by a paintbrush comprising multiple bristles sweeping across a canvas. The application may calculate a per-bristle opacity value using an exponential function dependent on a target opacity value for the brush stroke and an expected number of overlapping bristles during the brush stroke. The per-bristle opacity value may be used to determine per-bristle effects of the deposition of paint on the color and/or opacity values of the canvas pixels affected by the brush stroke as these per-bristle effects are composited to determine the cumulative effect of the brush stroke. The per-bristle opacity value may be calculated based on the brush orientation or position, direction of the stroke, number of bristles, type or shape of the brush tool, and/or pressure applied to the brush tool.

20 Claims, 12 Drawing Sheets natural brush stroke
920 single bristle sweep
940 two overlapping
bristle sweeps
960 five overlapping
bristle sweeps
980 single bristle sweep
1010 five overlapping
bristle sweeps
1020 single bristle sweep
1030 ten overlapping
bristle sweeps
1040 single bristle sweep
1050 twenty-five overlapping
bristle sweeps
1060 mark with 75% opacity
1070 single bristle sweep
1110 five overlapping bristle
sweeps
1120 single bristle sweep
1130 ten overlapping bristle
sweeps
1140 single bristle sweep
1150 twenty-five overlapping
bristle sweeps
1160 mark with 75% opacity
1170

SYSTEM AND METHOD FOR CREATING STROKE-LEVEL EFFECTS IN BRISTLE BRUSH SIMULATIONS USING PER-BRISTLE OPACITY

BACKGROUND

1. Field of the Disclosure

This disclosure relates generally to computer systems; and more particularly, it is directed to the simulation of brushes for deposition of paint or ink onto a virtual canvas using computer systems, and the determination of the results of such simulations using a per-bristle opacity value calculated from a target brush stroke opacity value.

2. Description of the Related Art

Digital image editing is the process of creating and/or modifying digital images using a computer system. Using specialized software programs, users may manipulate and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. Another commonly used representation is a CMYK color space. In these and other color space representations, an alpha channel may be used to store additional data such as per-pixel transparency values (or the inverse-opacity values). For example, per-pixel data representing paint on a brush tool or on a canvas may include a set of color values (e.g., one per channel) and an opacity value for the paint.

An operation often provided by a digital image editor is the use of a virtual "paintbrush" (also referred to herein as a "brush" or a "brush tool") to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image. In some systems, a brush tip is represented as a single triangle mesh.

Some existing digital painting applications create strokes by repeatedly applying a stamp at incremental positions along a path. The stamp consists of a 2D array of pixels that represent what the "brush" looks like at an instant in time. By repeatedly applying the stamp at close spacing, the effect of the brush being dragged continuously across the canvas is created, in the form of an elongated stroke. Some existing applications provide two settings for users to control the appearance of the stroke: flow and opacity, where the flow value represents the stamp transparency, and the opacity value represents the transparency of the entire stroke. However, a problem with this approach is that the results when setting the flow to a given value can be unpredictable, and can vary with other aspects of the stroke, such as with the spacing of the stamps. For example, when stamps having a particular flow value are spaced close together, the opacity of the overall brush stroke may be much higher than when stamps having the same flow value are spaced farther apart.

SUMMARY

The method, system, and computer-readable storage medium described herein may in some embodiments be used to simulate bristle brush behavior in an image editing application. In some embodiments, the image editing application may receive user input representing a stroke made by a paintbrush comprising multiple bristles sweeping across a canvas. In such embodiments, in order to achieve a desired stroke-level effect, the image editing application may determine the color and/or opacity values for the marks made by the individual bristles such that when they are composited together, the mark made by the brush stroke as a whole has the desired appearance, as specified by the user. Some stroke-level qualities, such as color, may not need any special treatment, as compositing layers of paint having the same color may not change the final color of the destination pixels. However, other stroke qualities, such as opacity, may need to be handled differently. The system and methods described herein may perform calculations to determine an appropriate bristle-level opacity value in order to achieve a desired stroke-level opacity for a mark made with a bristle brush.

In some embodiments, an image editing application may receive user input specifying a target opacity value for a brush stroke. In such embodiments, an image editing application may calculate a per-bristle opacity value using an exponential function that is dependent on the specified target opacity value for the brush stroke and on the number of bristles that are expected to have overlapping paths during the brush stroke. The per-bristle opacity value may be used to determine per-bristle effects of the deposition of paint on the color and/or opacity values of the canvas pixels affected by the brush stroke, as these per-bristle effects are composited to determine the cumulative effect of the brush stroke.

The per-pixel data generated by compositing the effects on the color and opacity of destination pixels (e.g., canvas pixels affected by the brush stroke) may include color and opacity values resulting from the deposition of paint by the brush stroke. This per-pixel data may be stored by the image editing application as it is generated (e.g., in a temporary stroke buffer), and the final composited results of the brush stroke (i.e. the per-pixel data generated for the destination pixels as a result of the brush stroke) may be stored for subsequent use in the image editing application (e.g., for a subsequent mixing or compositing operation involving one or more other brush strokes that deposit paint at some or all of the same destination pixels).

In various embodiments, the per-bristle opacity value may be calculated by the image editing application, and this calculation may be dependent on the target opacity for the brush stroke as a whole and on one or more of: the type and/or shape of a brush tool of the image editing application used to apply the brush stroke, the number of bristles in the brush tool, the spacing and/or pattern of bristles in the brush tool, and/or on the expected number of overlapping bristles for the brush stroke (i.e. the number of bristles whose paths are expected to overlap for the bulk of the destination pixels affected by the brush stroke).

In various embodiments, the expected number of overlapping bristles may be calculated by the image editing application, and this calculation may be dependent on the initial orientation and/or position of the brush tool, the initial direction and/or arc of the brush stroke, and/or the pressure applied to the brush tool during the stroke. In some embodiments, if the position and/or orientation of the brush tool changes, the direction and/or arc of the brush stoke changes, or the pressure applied to the brush tool changes, the image editing application may re-calculate the per-bristle opacity value in response to the change(s), and may use the new per-bristle opacity value in determining the effect on canvas pixels affected by the brush stroke subsequent to the change(s).

Figure 1:
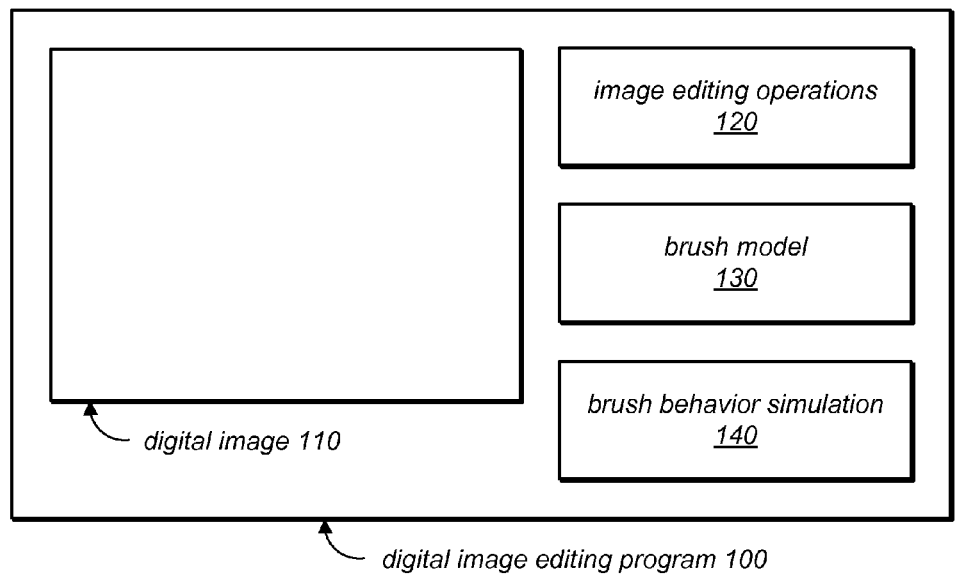
FIG. 1 is a block diagram illustrating one embodiment of a digital image editing program configured for the simulation of brushes.

The specific embodiments described herein and shown by way of example in the drawings are susceptible to various modifications and alternative forms. It should be understood, therefore, that drawings and detailed description thereto are not intended to be limited to the particular form disclosed, but on the contrary, the disclosure is to cover all modifications, equivalents and alternatives falling within the spirit and scope as defined by the appended claims.

DETAILED DESCRIPTION OF EMBODIMENTS

When creating digital brush strokes in an image editing application, users often want to control various aspects of the mark appearance. For example, the user may wish to control global stroke qualities, such as the color and opacity of the mark as a whole (i.e. the effective color and opacity for the bulk of the mark, as observed by the user). However, in a brush simulation engine that operates by simulating the individual bristles of a real bristle brush (i.e. a simulation that operates on a per-bristle level), the mark generation algorithm may only be able to control the qualities of the individual bristles. In such embodiments, in order to achieve the desired stroke-level results, the marks made by the individual bristles may be made so that when they are composited together, the mark made by the brush stroke as a whole has the desired appearance, as specified by the user. Some stroke-level qualities, such as color, may not need any special treatment, as compositing layers of paint having the same color may not change the final color of the destination pixels. However, other stroke qualities, such as opacity, may need to be handled differently. The system and methods described herein may perform calculations to determine a bristle-level opacity value in order to achieve a desired stroke-level opacity, based on marks made with a bristle brush.

In some embodiments, stroke generation for a bristle brush may be modeled as if each bristle creates a polygon representing the swept area covered by the bristle over some unit time. Some or all of these polygons may overlap, e.g., where the paths of the bristles overlap during the brush stroke. Therefore, paint may be accumulated at some or all of the destination pixels, the amount of paint accumulating at a given pixel being dependent on the number of bristles whose paths include the given pixel. Some image editing applications may model the effects of a brush stroke made by a bristle brush by collecting pixel data representing paint deposited by each bristle into a temporary stroke buffer and then determining how that buffer is composited. Other image editing applications may model the effects of a brush stroke made by a bristle brush by creating a single filled path that envelops a collection of stamps made by the bristles and then setting the parameters of that path. In some cases, setting a value for per-bristle opacity in these applications may create an unpredictable stroke level effect as the number of bristles varies.

The system and methods described herein for calculating a per-bristle opacity value and using that value in a compositing operation to determine the cumulative effect of a brush stroke made by a bristle brush may have the advantage that the system allows interesting effects that result from stamp level behaviors to be retained, while providing stroke level control in a predictable manner. For example, for bristle brushes, the texture generated across a brush stroke may depend on the opacity value for the paint deposited by the individual bristles. Using the methods described herein to compute per-bristle opacity may retain this texture.

The description that follows includes a discussion of a brush stroke model representing a bristle brush, and physical simulations of bristle brushes, as well as descriptions of various embodiments of systems and methods for calculating a per-bristle opacity value and using that value to determine the cumulative effect of a brush stroke made by a bristle brush.

Using embodiments of the systems and methods described herein, realistic brush behavior may be simulated in a painting application. In one embodiment, the brush behavior may be simulated substantially in real-time to deposit ink or paint onto a virtual canvas. A brush model may include a large set of discrete bristles. The bristles may comprise "virtual" bristles and may also be referred to herein as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. By computing the effect of each bristle independently of other bristles, a faithful reproduction of how a real brush deposits paint or ink and changes shape during a stroke may be achieved.

FIG. 1 is a block diagram illustrating an embodiment of a digital image editing program 100 configured for use with the brush simulation techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

Using the image editor 100, a user may seek to apply pixel values (also referred to herein as "paint" or "ink") such as pixel colors and alpha (e.g., transparency) values to the digital image 110. For example, the user may desire to paint portions of the image 110 using a paintbrush provided by the editing operations 120 of the image editor 100. The digital image editing program 100 may comprise a brush model 130 that is used to model such a paintbrush. The digital image editing program 100 may also comprise instructions to implement brush behavior simulation functionality 140. As will be described in greater detail below, the brush behavior simulation functionality 140 may comprise one or more operations to simulate behavior of a paintbrush. The brush behavior simulation functionality 140 may use the brush model 130.

Figure 2:
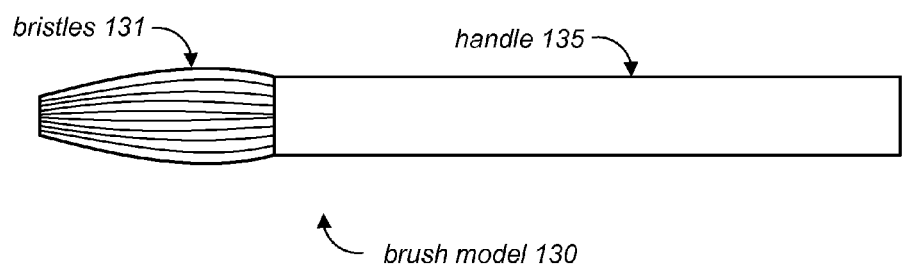
FIG. 2 is a block diagram illustrating a brush model, according to one embodiment.

FIG. 2 is a block diagram illustrating a simplified brush model according to one embodiment. In one embodiment, a brush may be simulated as a set of discrete "virtual" bristles. As shown in FIG. 2, the brush model 130 may comprise a plurality of bristles 131. The plurality of bristles 131 may also be referred to herein as bristle representations 131. In one embodiment, the brush model may also comprise a brush handle 135. The brush handle 135 may also be referred to herein as a brush handle representation 135. The plurality of bristles 131 may be attached to the end of the handle 135. In one embodiment, the bristles 131 may include a sufficient number of individual bristles (e.g., 50 to 100) for accurate simulation of the behavior of a real brush.

Figure 3:
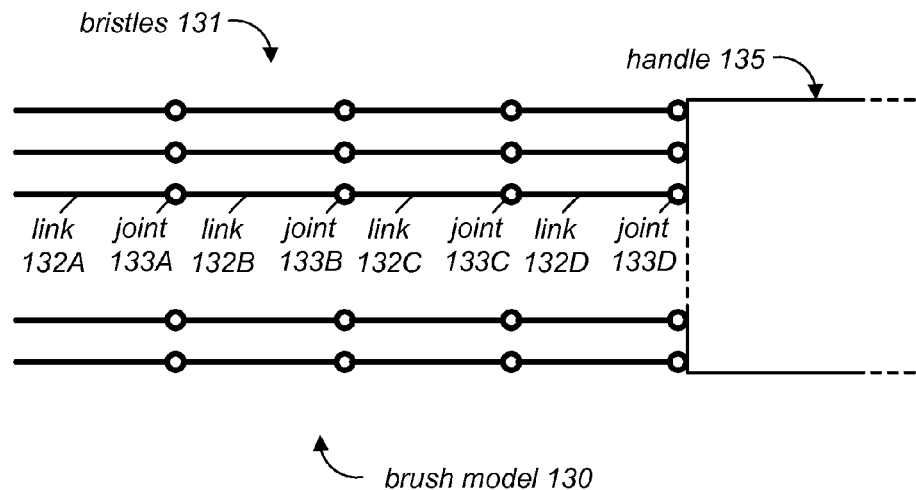
FIG. 3 is a block diagram further illustrating a brush model, according to one embodiment.

FIG. 3 is a block diagram further illustrating a brush model according to one embodiment. Each bristle may comprise a series of links. Each link may comprise a thin cylinder such as a cylinder having a minimal (e.g., nearly zero) radius. The links in a bristle may be connected end-to-end. The connections between links may comprise ball-and-socket joints. The connections between the handle 135 and the first link in each bristle may also comprise ball-and-socket joints. The ball-and-socket joints may permit arbitrary rotational movement with three degrees of freedom (3DOF). As shown in the example of FIG. 3, one bristle may comprise a set of links 132A, 132B, 132C, 132D. The links 132A, 132B, 132C, 132D may be connected to each other by ball-and-socket joints 133A, 133B, 133C. The bristle may be connected to the brush handle 135 by an additional ball-and-socket joint 133D. In one embodiment, the number of links in a bristle may control the size of curves that the bristle can form, where the size is proportional to the length of the bristle. Tighter curves may be possible with more links, and smoother shapes may be typical with fewer links. Because "real world" brush bristles generally do not form tight curves or small loops, few links may be used for each bristle in one embodiment.

In one embodiment, motion of the brush model 130 may be determined using standard articulated rigid body dynamics with hard constraints. Thus, for each object being simulated (e.g., each link or handle), the motion may be computed as a six-degrees-of-freedom (6DOF) rigid body which is subject to the constraints imposed by the joints between objects. A real brush bristle tends to resist deformation by exerting force to restore its shape at rest (i.e., a rest shape). To simulate the stiffness of a brush bristle, each joint in the brush model 130 may exert some force. The rest shape of the bristle may be defined in terms of the rest angles of each joint. For a straight bristle, for example, each angle may be set to zero. Joint limits may be used to restrict the valid angles of each joint to zero, and a stiff constraint force may be used to restore the joint limits. Because brush bristles are a classic stiff dynamic system comprising large forces that change quickly, an implicit solver may be used to ensure stability in one embodiment.

Figures 4A, 4B:
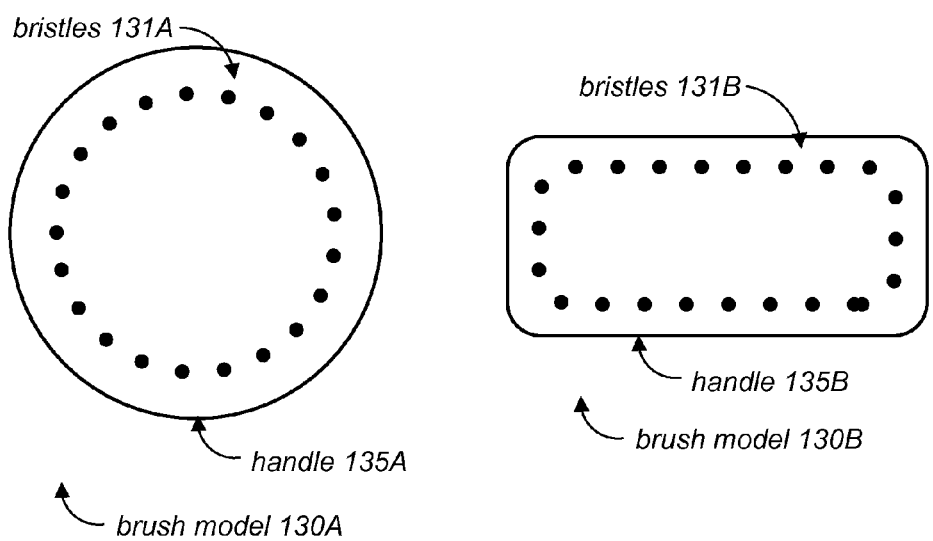
FIGS. 4A and 4B are block diagrams illustrating examples of brush models, according to various embodiments.

Different types of brushes may be simulated by varying the parameters of the brush model 130. The parameters of the brush model 130 may be altered to generate different bristle materials, different configurations (e.g., arrangements) of bristles, and different types of brush deformation behavior (e.g., bristle splitting, bristle bending, etc.). FIGS. 4A and 4B are block diagrams illustrating examples of different brush types according to one embodiment. For example, a standard round brush may have bristles distributed within a circle on the handle, with the bristles in the same direction and with a tapered end. The brush model 130A shown in FIG. 4A may simulate this circular arrangement of bristles 131A attached to a handle 135A. A flat brush may have a rectangular cross section with bristles of the same length. The brush model 130B shown in FIG. 4B may simulate this arrangement of bristles 131B attached to a rectangular handle 135B. A fan brush may distribute its bristles across an arc with radial direction and uniform length. Additionally, different bristle materials (e.g., camel hair, badger, red sable, nylon, etc.) may be simulated by changing the stiffness of each joint along the bristle. For example, some fiber types may be more stiff overall, and others may be stiff at the base but become less stiff towards the tip.

In one embodiment, the brush model 130 may be used in the simulation of brush behavior (using the brush behavior simulation functionality 140). The shape formed by the bristles in contact with the canvas may be referred to as a brush contact shape. In general, the simulation of brush behavior may include sweeping the two-dimensional (2D) image of the brush contact shape along a 2D curve defined by the motion of the brush between simulation steps. Using prior approaches to create the swept area, the 2D image was stamped at substeps along the curve to approximate the solution for a number of substeps determined by a sampling rate. Use of the brush behavior simulation functionality 140 may substantially avoid the sampling artifacts found in some prior approaches that apply a stamp along a path.

In one embodiment, continuous brush strokes may be created between discrete simulation steps using the brush model 130 discussed above. Because each bristle is simulated as a series of links, the swept volume of a bristle (i.e., the volume swept by a bristle during a stroke) may be computed as the sum of the swept volumes of each link. Each link may comprise a thin cylinder that can be approximated by a line. The swept volume of the thin cylinder may be orthographically projected into 2D to determine the final canvas mark. Therefore, instead of sweeping a cylinder to generate a volume, the final mark may be approximated by sweeping a line for each cylinder to generate a quadrilateral (also referred to herein as a quad).

To sweep a line into a quad, the quad may be constructed by connecting the end points of the beginning line segments and the end points of the ending line segments. Each quad may then be orthographically projected to the canvas plane to create the final mark. To simulate the portion of each bristle that is in contact with the canvas, a height threshold may be used to clip the portion of each bristle that is not in "contact" with the canvas (i.e., above the height threshold). Using this clipping technique, the behavior of pushing the brush harder into the canvas to create a larger mark may be simulated.

Figure 5A:
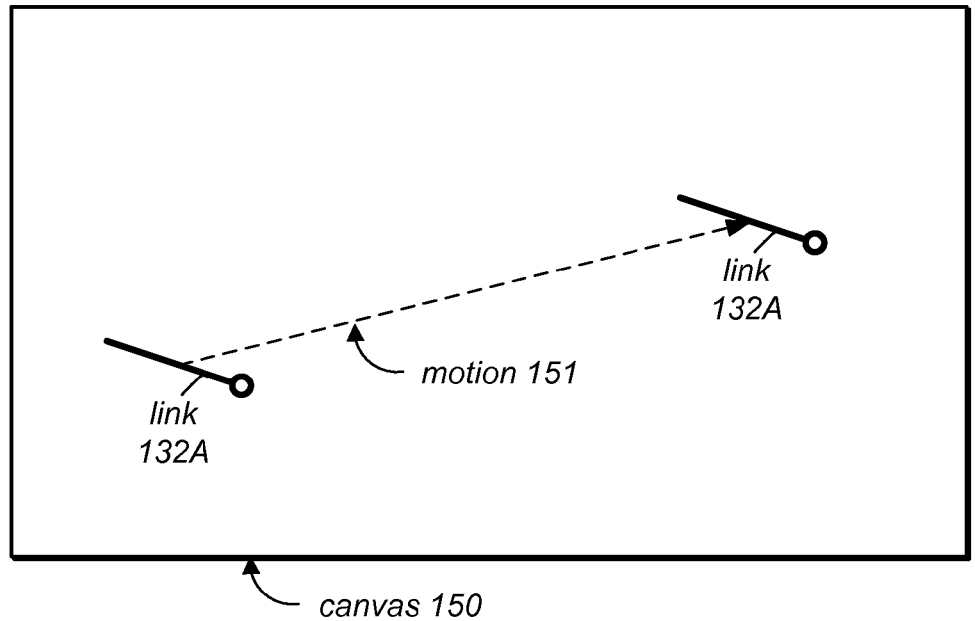
FIGS. 5A and 5B are block diagrams illustrating examples of a brush behavior simulation, according to one embodiment.
Figure 5B:
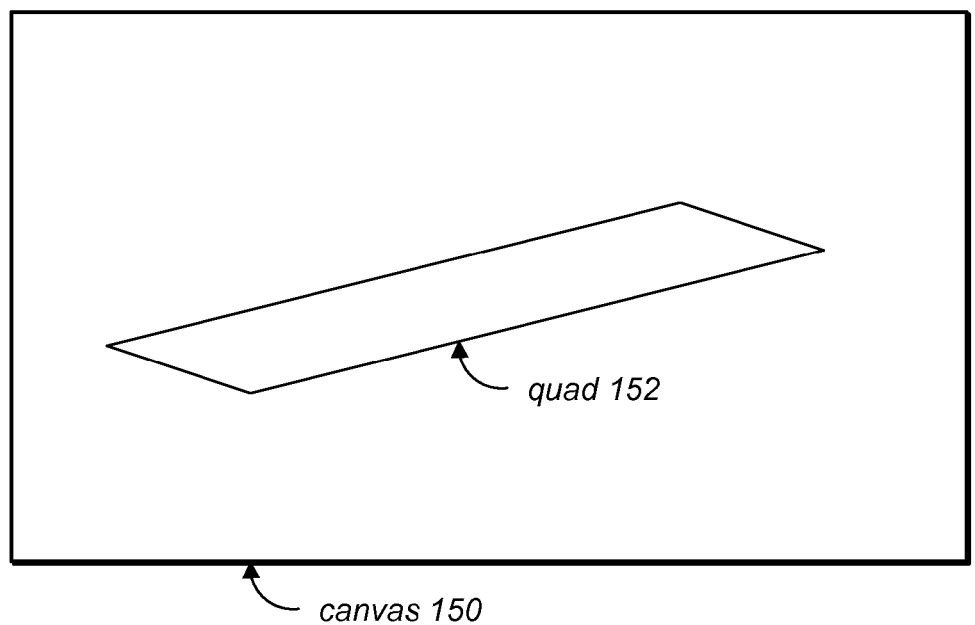

FIGS. 5A and 5B are block diagrams illustrating an example of the brush simulation according to one embodiment. FIG. 5A shows a link 132A of a bristle in "contact" with a canvas 150. The canvas 150 may represent a portion of a larger canvas. The canvas 150 is "painted" by moving the link 132A according to a particular motion 151. The two instances of the link 132A may correspond to two steps in a brush simulation. In the example shown in FIG. 5A, the entire link 132A is in contact with the canvas at both the beginning and end positions. FIG. 5B illustrates the quad 152 that is generated by the motion of the link 132A in contact with the canvas. The quad 152 may be generated by connecting the endpoints of the line segment corresponding to the link as it contacts the canvas at the two positions. A mark (also referred to as "paint" or "ink") corresponding to the quad 152, including one or more pixels with appropriate color and transparency values, may be generated in a corresponding location in the digital image 110. By generating a quad and a corresponding mark in this manner for every link in every bristle that contacts the canvas, continuous brush strokes may be created between discrete simulation steps using the brush model 130. In one embodiment, the same region of the canvas may be stroked more than once to simulate a buildup of paint or ink that results in a darker color than a single stroke.

In one embodiment, the approximation of a bristle's swept area may be inaccurate if a quadrilateral corresponding to a nearly vertical bristle is too thin to leave a mark because no pixels are hit by the projection onto the canvas. To account for this potential inaccuracy, a line segment having a width of one may be rasterized for each bristle between the end points of the bristle's last link. In this manner, each bristle in contact with the canvas may be guaranteed to make a minimum thickness mark (e.g., a mark of at least one pixel) under any deformation. Although the resulting additional pixel along the edge of the brush's mark may be incorrect when the bristle is not vertical, the error may be too small to affect the final output mark significantly.

Appropriate user input may be captured in connection with the brush behavior simulation functionality 140. For example, the user input may include a selected brush type as well as the position of the brush and the direction of its movement relative to a canvas. The user input may also include a "pressure" value that may be captured with an appropriate input device such as a digitizing tablet and/or stylus. The input pressure may be used to simulate the pressure applied to the brush. Using the brush model 130 and brush behavior simulation 140 discussed above, the input pressure may be used to deform the bristles 131 into a wide range of shapes in contact with the canvas. The shape of the brush tip may change throughout a stroke as the input pressure changes.

Figure 6:
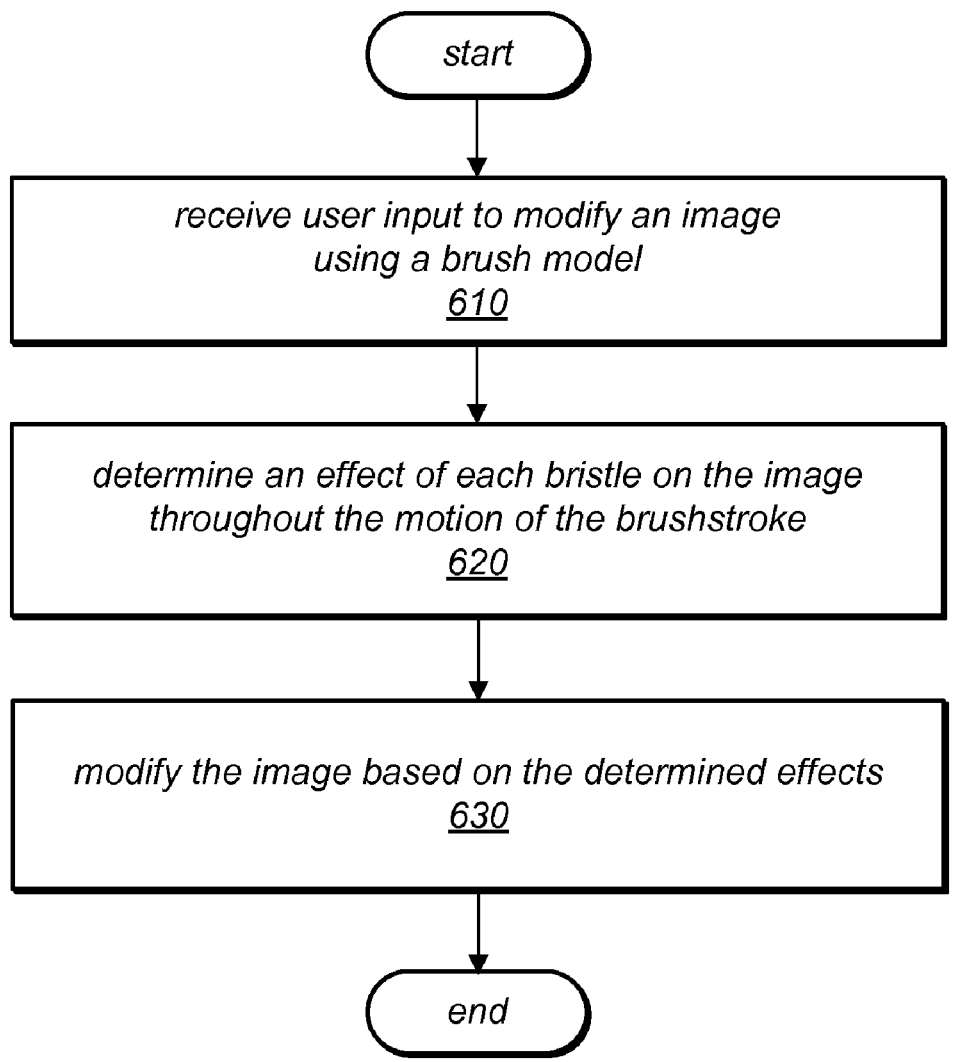
FIG. 6 is a flow diagram illustrating a method for simulating brush behavior, according to one embodiment.

FIG. 6 is a flowchart illustrating a method for simulating brush behavior according to one embodiment. As shown in 610, user input may be received to modify an image using a brush model. As discussed above, the brush model may comprise a plurality of bristle representations, and each bristle representation may comprise a series of one or more links. The user input may comprise a motion of the brush model, such as a motion between a first position (e.g., at a first simulation step) and a second position (e.g., at a second simulation step). The user input may also comprise one or more paint values representing a color of the "paint" or "ink" sought to be applied.

As shown in 620, an effect (if any) of each of the plurality of bristle representations on the image throughout the motion may be determined. In one embodiment, a continuous stroke may be determined in 620 for each of the plurality of bristle representations between the first simulation step and the second simulation step. In one embodiment, an approximation of a volume swept by each bristle representation between the first simulation step and the second simulation step may be determined in 620. In one embodiment, a clipping operation may be used in 620 to determine a portion of the plurality of the bristle representations located between a canvas and a plane above the canvas.

In one embodiment, a set of the links that contact the canvas in the first simulation step and the second simulation step may be determined in 620. A quadrilateral may be determined for each link in this set of links. The quadrilateral may comprise the end points of the portion of the respective link contacting the canvas at the first simulation step and the second simulation step. The effect of the paint in each quadrilateral may then be determined.

As shown in 630, the image may be modified based on the determined effect of each of the plurality of bristle representations on the image throughout the motion. For example, color values of pixels affected by the stroke of the brush may be modified. In one embodiment, each bristle representation in "contact" with the canvas may affect at least one pixel along its path from the first simulation step to the second simulation step.

In one embodiment, a suitable simulation engine such as the Open Dynamics Engine (ODE) may be used to implement the brush model 130 and/or brush behavior simulation 140 discussed above. ODE may comprise a framework for constrained dynamics simulations. Using ODE, each of the bristles 131 may be modeled as a chain of rigid capped cylinders (e.g., capsules) connected end-to-end by rotational joints, with each bristle attached at one end to the brush handle 135. The joints may be modeled as 3DOF ball-and-socket joints. The canvas 150 may be modeled with a single plane. The bristles 131 may collide with the plane of the canvas during a stroke, and the collision may cause the brush tip to deform. The user input may be used to generate the brush position with an explicit restorative force computed at each timestep. Given the target pose (e.g., position and orientation), the force and torque needed to change the brush's current pose and momentum to the target pose may be computed directly. The computer force and torque may be applied as external forces using the simulation engine (e.g., ODE).

Restorative forces may be used in the modeling of bristles that attempt to return to a rest shape. In one embodiment, joint limits may be specified using the simulation engine (e.g., ODE) for the modeling of restorative forces. Start and stop angles may be specified for each joint using the simulation engine (e.g., ODE). By setting all the angles to the same value, the effect of a rest angle may be created. The constraint force mixing (CFM) and error reduction parameter (ERP) for a joint may be set to yield behavior equivalent to a spring-damper system, and a force limit may keep the joint from adding too much energy to the simulation at once. In simulating a spring-damper system, the forces may be integrated implicitly so that stiff bristle behavior may be simulated in real-time.

In one embodiment, explicit angular spring forces may be specified using the simulation engine (e.g., ODE) for the modeling of restorative forces. Start and stop angles may be specified for each joint using the simulation engine (e.g., ODE). By setting all the angles to the same value, the effect of a rest angle may be created. The pose of the links may be used to compute the angular spring torques manually after each simulation step. The angular spring torques may then be applied to the links as external forces.

The simulation engine (e.g., ODE) may be used to implement a constrained dynamics simulation. A constrained dynamics simulation may solve for constraint forces by creating an N·N matrix, where N is the number of degrees of freedom that are constrained. For bodies called islands that do not have constraints between them and do not interact, the matrix may be split into separate matrices for each island. Each matrix may be solved independently for a particular island. Because solving the matrix may be a problem of complexity $O(N^3)$, solving islands separately may typically be faster than solving the same bodies as one interrelated system. Therefore, the simulation of the brush behavior may be more computationally efficient if the brush bristles are separated so they are independent of one another.

As discussed above, each bristle may be connected by a joint to the same brush handle 135. However, because the handle mass may be large in comparison to the bristle mass, the error in brush pose for each frame may be very small. Thus, the brush handle 135 may be modeled as many separate brush handle bodies using the simulation engine (e.g., ODE). Each bristle may be attached to one of the separate brush handle bodies using a ball-and-socket joint. Although the computation of the force and torque necessary to move a brush handle may be performed separately for each brush handle body, such a computation is relatively inexpensive. The separation of the bristles permitted by the use of multiple brush handle bodies may permit each bristle to be solved independently. Therefore, the brush behavior simulation 140 may be both computationally efficient and scalable in a multi-processor or multi-core environment. In one embodiment, for example, 40 bristles may be simulated at 60 Hz on one core; alternatively, 75 bristles may be simulated at 30 Hz on one core.

In one embodiment, inter-bristle forces may be simulated. By including bristle-to-bristle collisions, contact joints between bristles may be created to enforce penetration constraints. By simulating inter-bristle forces, the bristles may spread and appear to maintain the volume of the brush tip more naturally when pressed into the canvas. In one embodiment, an approximation of the inter-bristle forces may be included in the brush behavior simulation 140 to achieve similar effects in a more computationally efficient manner. For example, explicit penalty forces may be added to provide similar bristle-to-bristle collision behavior without the need for additional constraints.

In one embodiment, the simulation engine (e.g., ODE) may provide various mechanisms for enforcing constraints in the simulation. One constraint enforcement mechanism may be referred to as dWorldStep. The dWorldStep functionality may be used to construct and solve the constraint matrix in $O(N^3)$ time. Another constraint enforcement mechanism may be referred to as dWorldQuickStep. The dWorldQuickStep functionality may be used to perform iterative relaxation to approximate the correct constraint forces in O(M N) time, where M is the number of iterations (e.g., 20). In one embodiment, the use of dWorldQuickStep in the brush behavior simulation may be faster than the use of dWorldStep. For example, for a 5-link bristle in which each joint is 3DOF, there are 15 constraints. Solving the matrix using dWorldStep may take approximately 3375 (i.e., $15^3$) units of time while solving the approximation using dWorldQuickStep may take approximately 300 (i.e., 15×20) units of time. The relative efficiency of dWorldQuickStep may be even more pronounced when inter-bristle forces are included.

As described above, when image editing operations are applied with a bristle brush tool of a image editing application, each bristle of the model makes a mark on the canvas, and the overall effect of the brush stroke is the cumulative effect of these marks. In some systems, a user may specify a target opacity value for an editing operation, e.g., indicating the desired opacity of the paint deposited by such a brush stroke. In a naïve implementation of such a feature, the image editing application may calculate the appearance of the marks left by each bristle of the brush as if the paint deposited by that bristle has an opacity value equal to the target opacity value for the stroke. However, such a naïve approach may not yield the desired results. For example, if the target opacity value for a brush stroke is 50%, and the opacity value assumed for each bristle of a brush tool is also 50%, then wherever the paths of two or more bristles overlap, the cumulative effect will be a swath of paint with an opacity value higher than 50%. In fact, if a large number of bristles overlap, the effect may be the deposition of paint that is entirely opaque (100%). In addition, such an approach may yield unpredictable results when different brush models are used to apply the paint. For example, if the image editing application includes a variety of brush tools with which to apply paint, and the number of bristles in the brush models varies, the results of two brush strokes following the same path and having the same target opacity value may be very different.

In some embodiments, in order to make stroke-level opacity predictable for a bristle brush, invariant to the number of bristles being simulated, the systems described herein may compute a per-bristle opacity value, given the target stroke opacity value. Under the conditions of normal compositing, the use of this per-bristle opacity value in calculating the effects of each bristle of the brush on the color and opacity of the canvas pixels in its path may result in a cumulative brush stroke mark exhibiting the target brush stroke opacity when the bristle paths overlap. In other words, the result of using such a per-bristle opacity value in calculating the effects of each bristle may be that the bulk of the canvas pixels affected by the brush stroke appear to have been painted over with paint having the desired opacity.

Figure 7:
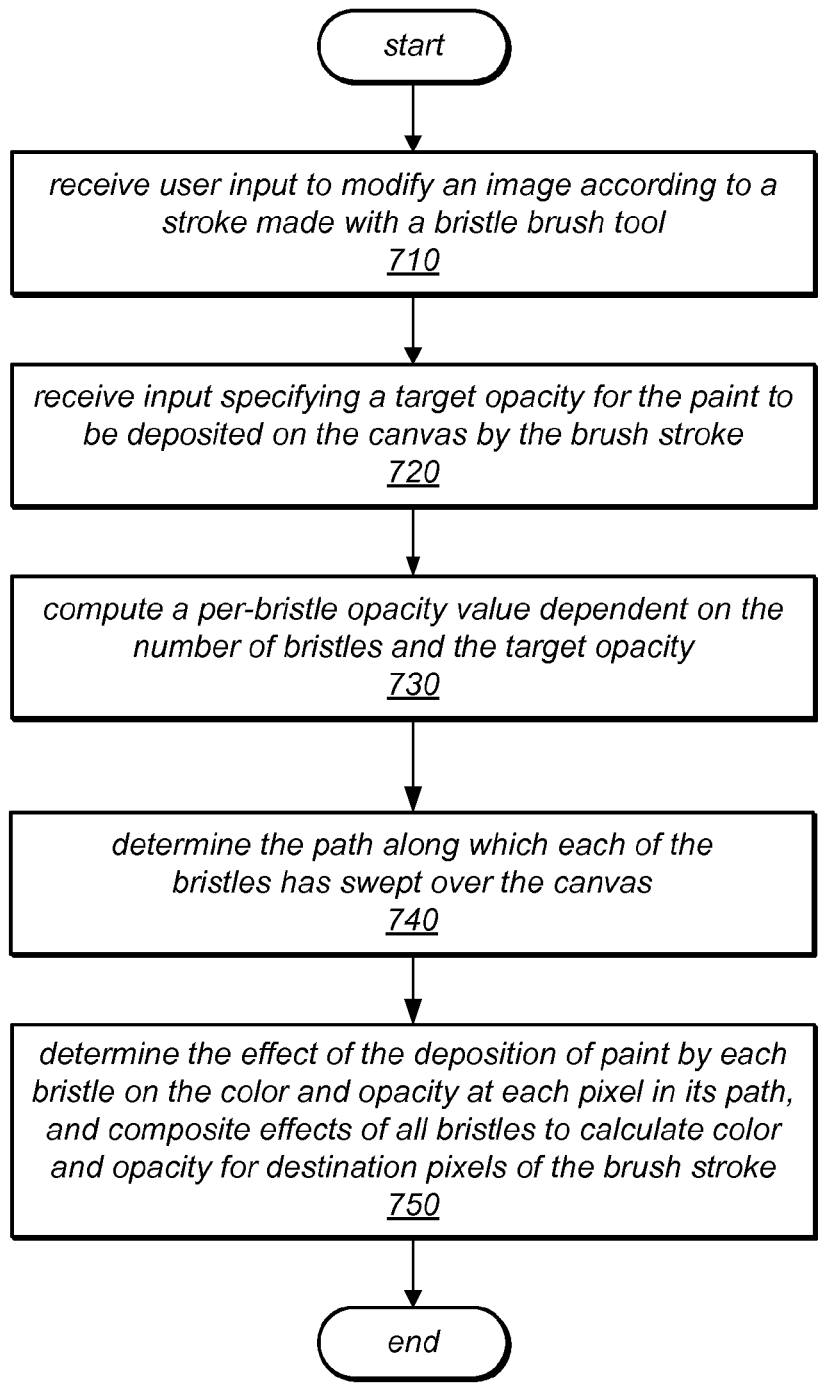
FIG. 7 is a flow diagram illustrating a method for performing an image editing application for which the cumulative effect of a brush stroke exhibits a specified opacity, according to one embodiment.

FIG. 7 illustrates a method for performing an image editing application for which the cumulative effect of a brush stroke exhibits a specified opacity, according to one embodiment. As illustrated at 710 in this example, the method may include the image editing application (e.g., a digital painting application) receiving input to modify an image in a manner defined by a mark made with a bristle brush tool (i.e. a brush stroke). For example, a user may select one of a plurality of available brush tools of a graphical user interface (GUI) of the image editing application, and may use it to "paint" a brush stroke on a blank canvas or on a canvas on which paint has already been deposited. In this example, the method may include the image editing application receiving input specifying a target opacity for the paint to be deposited on the canvas by the brush stroke, as in 720. For example, a slider bar or other user input mechanism of the GUI may be used to select a target opacity value for the paint chosen for application and/or for the particular brush stroke being applied, or to set or override a default opacity value in the image editing application, in different embodiments.

As illustrated at 730 in FIG. 7, the method may include the image editing application computing a per-bristle opacity value for the brush stroke, which may be dependent on the number of bristles in the brush tool and the target opacity value. As described in more detail below in reference to equation (3), in some embodiments, the computation of the per-bristle opacity may be an exponential function in which the exponent is the reciprocal of the number of overlapping brush bristles. As illustrated in this example, in some embodiments the method may include the image editing application determining the path along which each of the brush bristles has swept over the canvas, as in 740. The method may also include the image editing application determining the effect of the deposition of paint, by each bristle, on the color and opacity at each pixel in its path (i.e. the "mark" made by each bristle), and compositing the marks made by all of the bristles to calculate the color and opacity of the canvas pixels as a result of the brush stroke, as in 750. As described in more detail below with reference to equations (1) and (2), the effect of each bristle sweep on the color and opacity at a given pixel on the canvas (i.e. a destination pixel, D) may be dependent on the color and opacity values of the destination pixel prior to the bristle sweep, and the color and per-bristle opacity values of the paint being applied (which may be thought of as a source pixel, S, for the purposes of the compositing equations below).

In some embodiments, to determine the cumulative effect of a brush stroke made by a brush tool comprising multiple bristles, the brush stroke may be thought of as performing a compositing operation in which various ones of the bristles deposit paint on top of the paint deposited by other ones of the bristles (e.g., at the canvas pixels over which the paths of multiple ones of the bristles overlap). In some embodiments, this compositing operation may be treated as an alpha blending operation, in which the paint deposited by one bristle obscures the paint deposited by another bristle by an amount that is dependent on the alpha value of the paint. The equations for compositing a pixel of paint having a color $S_c$ and an alpha value $S_a$ (as deposited by a single bristle) on top of a destination pixel having a color $D_c$ and an alpha value $D_a$, resulting in composited values of $D_c'$ and $D_c'$ for the destination pixel, may in some embodiments be as follows:

$$D_c' = S_a S_c + (1 - S_a) D_c \quad (1)$$

$$D_a' = S_a + (1 - S_a) D_a \quad (2)$$

These equations may in some embodiments be used in a recursive manner to simulate the deposition of paint by multiple bristles at a given destination pixel. In other words, when calculating the effect of the deposition of paint by a second bristle on top of the paint deposition by a first bristle, the results of the first application of these equations ($D_c'$ and $D_a'$) may become $D_c$ and $D_a$ in the equations above. As noted above, S may refer to the "source pixel" (which in this example may represent a pixel of paint on a given bristle) and D may represent the "destination pixel" (i.e. a canvas pixel at which paint is deposited by the bristle). As can be seen in these equations, in some embodiments if the source and destination colors (e.g., $S_c$ and $D_c$) are the same, $D_c'$ may also remain the same. However, even if the alpha values $S_a$ and $D_a$ are the same, $D_a'$ may continue to increase in value as additional bristles deposit paint at the destination pixel.

Figure 8:
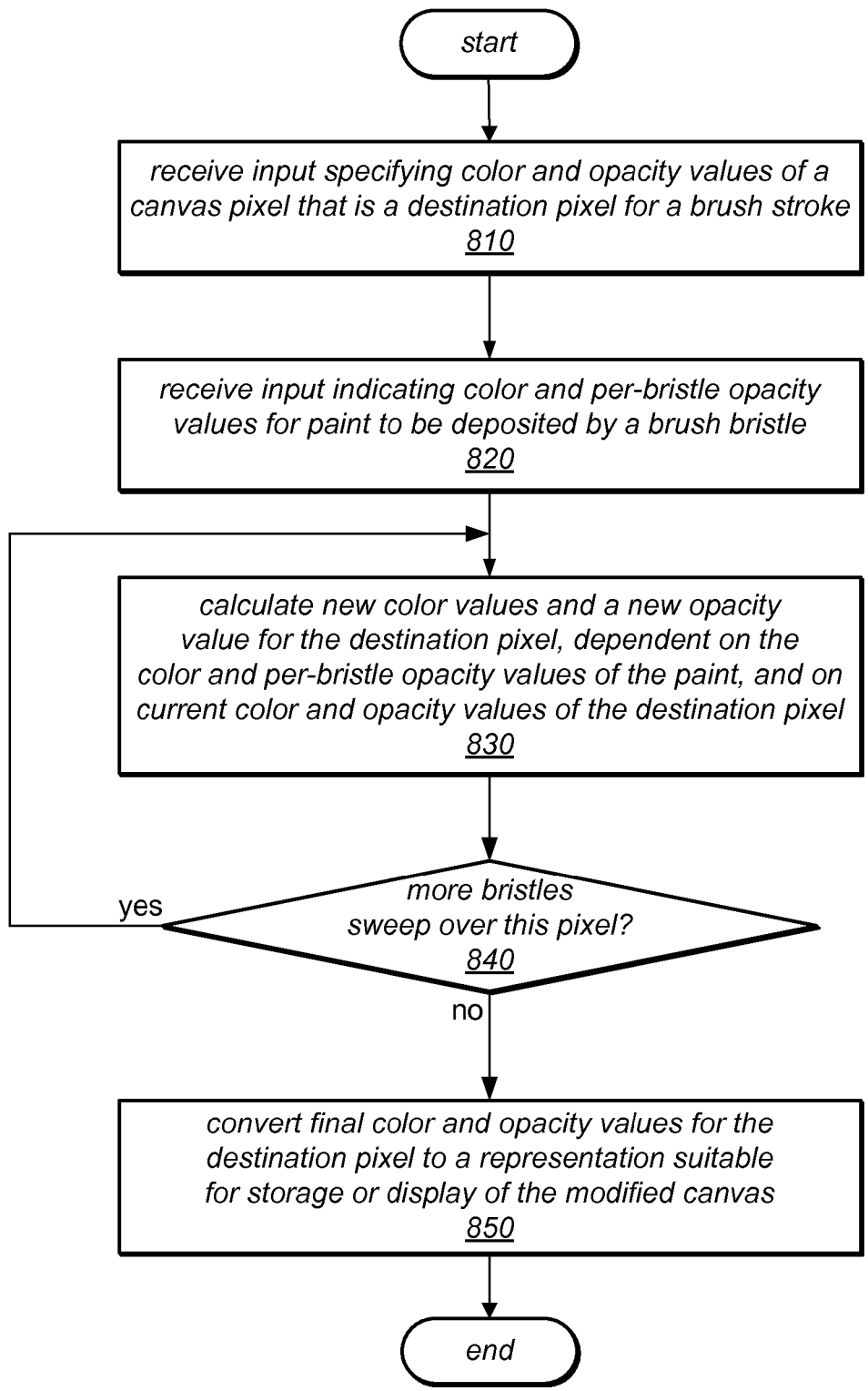
FIG. 8 is a flow diagram illustrating a method for compositing the effects of the individual bristles of a brush tool when applying a brush stroke to a canvas, according to one embodiment.

FIG. 8 illustrates a method for compositing the effects of the individual bristles of a brush tool when applying a brush stroke to a canvas, according to one embodiment. As illustrated at 810 in this example, the method may include an image editing application receiving input specifying color and opacity values of a canvas pixel that is a destination pixel for a brush stroke (i.e. a pixel over which a brush stroke passes, depositing paint). For example, the image editing application may receive input from a brush tool of a GUI of the image editing application defining a brush stroke to be applied to a canvas (e.g., a blank canvas, or a canvas on which paint has already been deposited), may determine the canvas pixels that are destination pixels of the brush stroke, and may access data representing the canvas pixels to obtain current color values (e.g., RGB values or CMYK values) and/or opacity values (i.e. alpha values) for those destination pixels.

As illustrated at 820 in this example, the method may include the image editing application receiving input indicating color and per-bristle opacity values for paint to be deposited by a brush bristle during the brush stroke. In some embodiments, the image editing application may receive input specifying a target opacity value for the brush stroke and may calculate a per-bristle opacity dependent on that value using the methods described herein, such as by the application of equation (3). In other embodiments, the image editing application may have already calculated (using these methods) and stored (at least temporarily) a per-bristle opacity value for a given brush tool (e.g., for the brush tool currently in use) and may access that per-bristle opacity value for use in calculating the results of the current brush stroke. Similarly, the image editing application may receive input indicating color values (e.g., RGB values or CMYK values) for the paint from the user (e.g., via the GUI) specifically for the current brush stroke, or may access color values for paint that is currently stored on the brush (e.g., for use in two or more brush strokes), in different embodiments. In one example, a user who has selected a brush tool of a GUI of the image editing application to paint a brush stroke on a canvas may use slider bars or other user input mechanisms to select color and/or a target opacity values for the paint to be applied by the brush stroke, and the image editing application may calculate a per-bristle opacity value dependent on the target opacity value and the number of overlapping brush bristles.

As illustrated in FIG. 8, the method may include the image editing application calculating new color values and a new opacity value for the destination pixel as a result of the deposition of paint by one of the brush bristles, dependent on the color and per-bristle opacity values of the paint, and on the current color and opacity values of the destination pixel (as in 830). For example, in some embodiments, the image editing application may apply equation (1) above to calculate new color values for the destination pixel, and may apply equation (2) above to calculate a new opacity value for the destination pixel. In some embodiments, if more of the brush bristles sweep over the destination pixel, shown as the positive exit from 840, the method may include repeating the calculations described at 830 for each additional bristle. For example, for each additional bristle of the brush stroke that sweeps over the destination pixel, the image editing application may use the results of the previous calculations of new color and opacity values of the destination pixel as the current values of the color and opacity for that pixel in equations (1) and (2) to calculate values that are further updated as a result of the deposition of additional paint by the additional bristle.

After all of the paint deposited by all of the bristles that sweep over the destination pixel have been composited to determine the final color and opacity values for the destination pixel as a cumulative result of the multiple-bristle brush stroke, shown as the negative exit from 840, the method may include converting the final color and opacity values for the destination pixel to a representation that is suitable for storage and/or display of the modified canvas, as in 850. For example, in some embodiments, the image editing application may calculate the results of various image editing operations in a color space that includes opacity values and/or other per-pixel data, in addition to color values (e.g., an RGBA or CMYKA color space). However, the image editing application may not support the display of image data in a color space that includes opacity values. In such embodiments, the image editing application may convert the per-pixel data to an RGB or CMYK representation for display.

Note that, in various embodiments, the operations illustrated in FIG. 8 for compositing the effects of the individual bristles of a brush tool when depositing paint at a given destination pixel may be repeated serially or in parallel for each of the canvas pixels affected by the brush stroke. For example, in some embodiments, these operations may be performed for two or more destination pixels in parallel on a graphics processing unit (GPU) configured to perform such calculations on image data. In still other embodiments, the operations illustrated in FIG. 8 may be performed in a different order than that illustrated in FIG. 8. For example, in one embodiment, a method for compositing the effects of the individual bristles of a brush tool when depositing paint on a canvas may calculate the effects of a single bristle for all of the canvas pixels in its path, using the calculations described herein, and then may repeat those operations for each of the other bristles before compositing the results.

As described in more detail here, the per-bristle opacity value might not be calculated by merely dividing the target brush stroke opacity value by the total number of brush bristles or the number of brush bristles whose paths are expected to overlap during the brush stroke. Instead, in some embodiments, the following equation may be used to determine the appropriate alpha value $S_a$ for each of N overlapping bristles (i.e. N bristles expected to have overlapping paths during the stroke) to achieve the desired final alpha, $F_a$:

$$S_a = 1 - (1 - F_a)^{\frac{1}{N}} \quad (3)$$

For example, according to equation (3), if a target brush stroke opacity value is 75%, and the expected number of overlapping bristles is five, the per-bristle opacity value would be 24%. However, for the same target brush stroke opacity value, if the expected number of overlapping bristles were ten, the per-bristle opacity value would be 13%; and if the expected number of overlapping bristles were twenty-five, the per-bristle opacity value would be 5.4%. A comparison of the results of the compositing of bristle sweeps made by brushes having five, ten, and twenty-five overlapping bristles using these per-bristle opacity values and using other approaches for determining per-bristle opacity values is illustrated in FIGS. 9-11.

Figure 9:
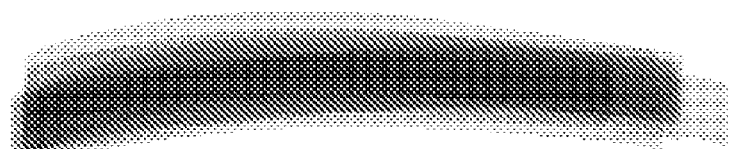
FIGS. 9-11 illustrate examples of compositing the results of multiple bristle sweeps to generate a representation of a brush stroke, according to various embodiment.
Figure 9:
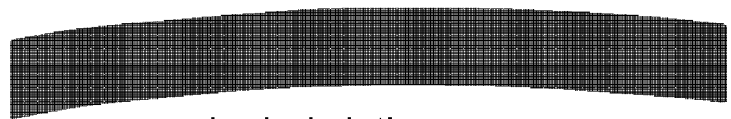
Figure 9:
Figure 9:
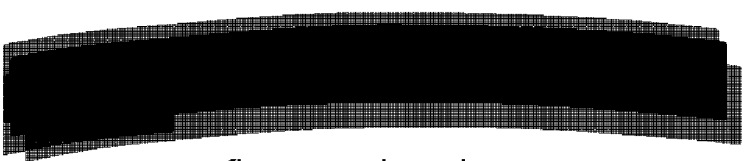

FIG. 9 illustrates the naïve implementation described above, in which the per-bristle opacity value is the same as the target brush stroke opacity value. In this example, the results of a natural brush stroke in which paint that is 75% opaque has been deposited on the canvas is depicted as 920. This paint deposited by this brush stroke has a higher opacity in the center of the mark (where many of the brush bristles overlap) and a lower opacity on the sides of the mark (where not as many of the brush bristles overlap), with the bulk of the mark exhibiting an opacity value of 75%. If an image editing application attempted to duplicate this brush stroke using individual bristle sweeps for which the paint deposited is assumed to be 75%, as in single bristle sweep 940, the results may appear very different from the target appearance depicted in 920. In this example, two overlapping bristle sweeps for which the paint is assumed to have a per-bristle opacity of 75% may appear as in brush stroke 960, which exhibits a cumulative stroke opacity higher than 75%. Similarly, five overlapping bristle sweeps for which the paint is assumed to have a per-bristle opacity of 75% may result in a brush stroke mark that is fully opaque, as in 980.

Figure 10:
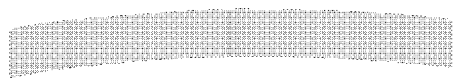
Figure 10:
Figure 10:
Figure 10:
Figure 10:
Figure 10:
Figure 10:

FIG. 10 illustrates another approach to determining a per-bristle opacity value that may not yield the desired results. In this example, the per-bristle opacity value may be calculated as the target brush stroke opacity value divided by the expected number of overlapping bristles (i.e. the expected number of bristles having overlapping paths). Again assuming a target stroke value of 75% opacity, the per-bristle opacity value for the application of paint by a brush having five overlapping bristles may be 15%, as in single bristle sweep 1010. Five such overlapping bristle sweeps may result in the cumulative brush mark shown as 1020. In this example, the per-bristle opacity value for a brush having ten overlapping bristles may be 7.5%, as in single bristle sweep 1030, and ten such overlapping bristle sweeps may result in the cumulative brush mark shown as 1040. Similarly, the per-bristle opacity value for a brush having twenty-five overlapping bristles may be 3%, as in single bristle sweep 1050, and twenty-five such overlapping bristle sweeps may result in the cumulative brush mark shown as 1060. Note that using this approach, none of the cumulative brush stroke marks 1020, 1040, or 1060 is as opaque as the target for the brush stroke of 75% opaque, as exhibited by the example sweep in 1070.

Figure 11:
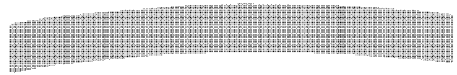
Figure 11:
Figure 11:
Figure 11:
Figure 11:
Figure 11:
Figure 11:

FIG. 11 illustrates example results of an embodiment in which equation (3) above is used to determine the per-bristle opacity value for a brush stroke of a multiple-bristle brush tool. In this example, again assuming a target brush stroke opacity value of 75%, the per-bristle opacity value for the application of paint by a brush having five overlapping bristles may be 24%, as in single bristle sweep 1110. Five such overlapping bristle sweeps may result in the cumulative brush mark shown as 1120. In this example, the per-bristle opacity value for a brush having ten overlapping bristles may be 13%, as in single bristle sweep 1130, and ten such overlapping bristle sweeps may result in the cumulative brush mark shown as 1140. Similarly, the per-bristle opacity value for a brush having twenty-five overlapping bristles may be 5.4%, as in single bristle sweep 1150, and twenty-five such overlapping bristle sweeps may result in the cumulative brush mark shown as 1160. Note that using this approach, all of the cumulative brush stroke marks 1120, 1140, and 1160 are approximately as opaque as the target for the brush stroke of 75% opaque, as exhibited by the example sweep in 1170.

As illustrated in FIG. 11, the systems and method described herein for calculating a per-bristle opacity value to be used in determining the effects of a brush stroke with a brush tool comprising multiple bristles may result in realistic painting effects in the image editing application. For example, where a large number of bristle paths overlap (e.g., for a wide swath of the destination pixels centered along the path of the brush tool), the resulting opacity value may be approximately the same as the target opacity value for the brush stroke, while along the edges of the mark left by the brush stroke (where fewer bristles of the brush tool overlap), the resulting opacity value may be less than the target opacity value for the stroke. In addition, in some embodiments, the system and method described herein may guarantee that the observed opacity value of a mark left by a single brush stroke may be no higher than the target opacity value specified for the brush stroke at any of the canvas pixels over which the brush stroke sweeps. Therefore, in some embodiments, the effective opacity of the brush stroke (as observed by a user) may better represent what the user had in mind when specifying a target opacity value for a brush stroke than if the target opacity value itself were used in the calculations of the per-bristle effects of the stroke.

As described in more detail below, the number of bristle paths that may be expected to overlap at any given destination pixel may vary based on a number of factors, including the type and/or shape of the brush tool, the total number of bristles on the brush tool, the pattern or spacing of the brush bristles, and the characteristics of the motion of the brush stoke. For example, the initial position and/or orientation of the brush tool, as well as the direction of the stroke and/or the pressure applied during the stroke may affect the number of bristles that come in contact with any given canvas pixel.

Figure 12:
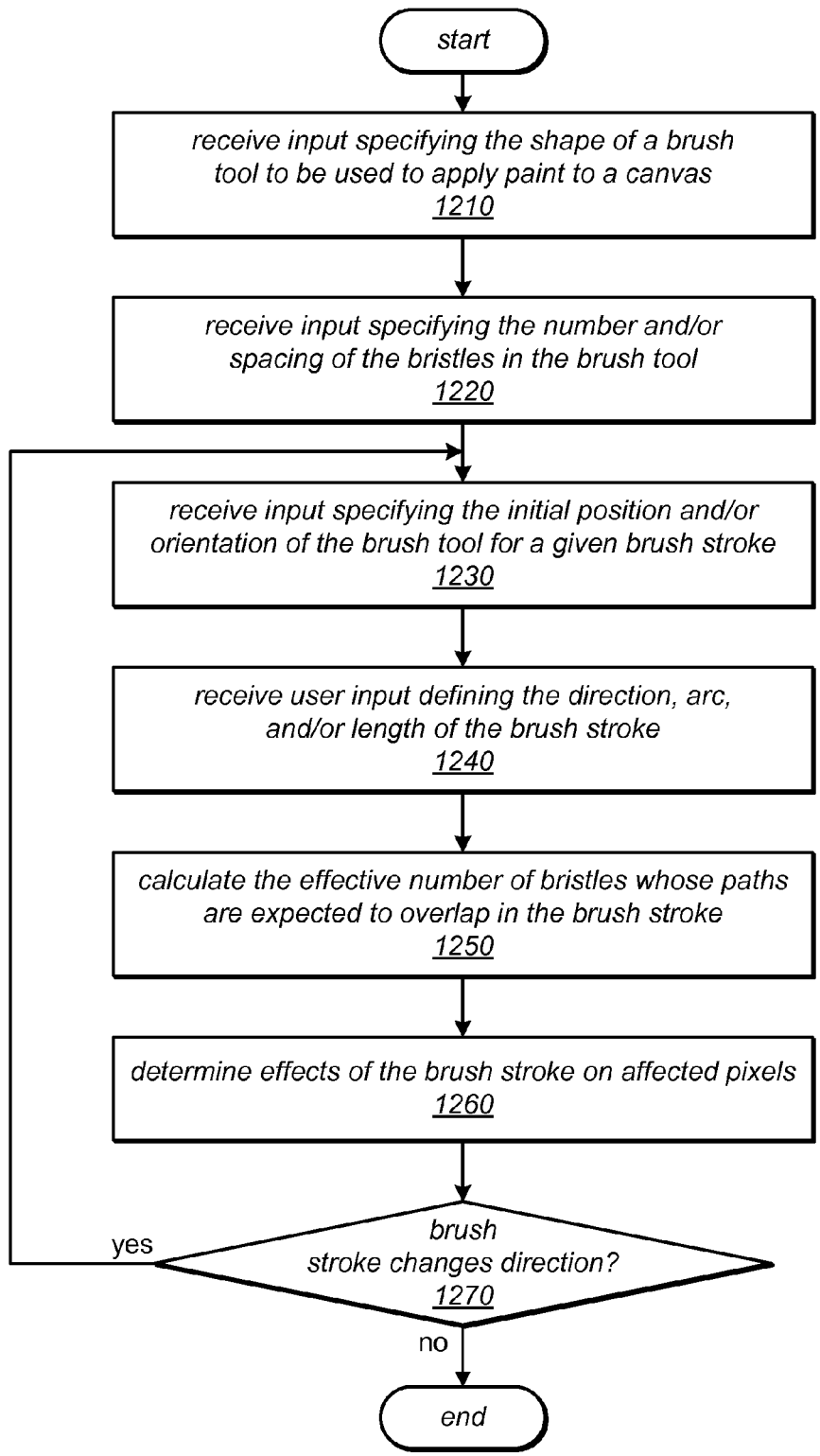
FIG. 12 is a flow diagram illustrating a method for determining the number of bristles of a bristle brush that are expected to have overlapping paths during a single brush stroke, according to one embodiment.

A method for determining the expected number of overlapping bristles of a bristle brush during a single brush stroke is illustrated in FIG. 12, according to one embodiment. As illustrated in this example, the method may include receiving input specifying the shape of a brush tool to be used to apply paint to a canvas in an image editing application (as in 1210). For example, in some embodiments, a user may select one of a plurality of available brush tools in a GUI of the image editing application, and each of these brush tools may represent a paintbrush of a different size and/or shape (e.g., angular, oval, round, fan, filbert, flat, hake, etc.). As illustrated in FIG. 12, the method may also include the image editing application receiving input specifying the number and/or spacing of the bristles in the brush tool (as in 1220). For example, various ones of the brush tools available through the GUI may have a different number of bristles, and the bristles may be arranged in different patterns and/or with different spacing. Different brush tools may also have bristles of different thicknesses, in some embodiments. In some embodiments, receiving input specifying the number of bristles or other bristle parameters may involve accessing parameter values for each of the brush tool models of the image editing application from a configuration file or other data store accessible to the image editing application.

As illustrated in this example, the method may include the image editing application receiving input specifying the position and/or orientation of the selected brush tool at the beginning of a brush stroke (as in 1230). For example, the GUI may provide mechanisms for indicating the position and/or orientation of the brush tool (e.g., using radio buttons, slider bars, a mouse, or a track ball). In some embodiments, the method may include receiving input defining the initial direction and/or arc of the brush stroke as it begins to sweep across the canvas, as in 1240. For example, the user input may include the direction of its movement relative to the canvas as defined using an input device such as a digitizing tablet and/or stylus. As previously noted, the user input captured through such a tablet or stylus may also include the pressure applied to the brush stroke by the user, which may be used to simulate the pressure applied to a paintbrush to achieve a desired effect.

As illustrated at 1250 in FIG. 12, the method may include the image editing application calculating the effective number of bristles whose paths may be expected to overlap as a result of the given brush stroke, and this calculation may be dependent on the number of bristles, as well as any of all of the following: the pattern and/or spacing of the bristles, the thickness of the bristles, the initial position and/or orientation of the brush tool, and the path defined for the brush stroke. In some embodiments, and/or for some brush tool types, all of the bristles of a brush tool may be expected to overlap at all affected pixels of the canvas (i.e. at all of the destination pixels). In other embodiments, the average number of bristles whose paths overlap for the bulk of the mark made by a brush stroke, or the mode of the number of bristles whose paths overlap at the pixels affected by the brush stroke may be considered the expected number of bristles whose paths overlap. For example, in a brush stroke made by a brush tool with twenty-five bristles that has a compact (i.e. narrow) shape, the number of bristles that may be expected to overlap for the bulk of the affected pixels may be much higher than the number of bristles that may be expected to overlap for the bulk of the affected pixels in a brush stroke made by a brush tool with twenty-five bristles that has a wide shape (e.g. a fan shape). In another example, in a brush stroke made with a fan shaped brush tool, the number of bristles that may be expected to overlap when the brush tool is oriented so that it makes a wide mark on the canvas may be much lower than the number of bristles that may be expected to overlap when the brush tool is oriented so that it makes a narrow mark on the canvas.

In this example, as long as the direction or arc of the brush stroke and orientation of the brush tool do not change, this expected number of overlapping bristles may be used in calculations to determine the effects of the brush stroke on the canvas pixels over which the brush stroke sweeps, as shown in 1260. For example, in some embodiments the image editing application may use equation (3) above to determine a per-bristle opacity based on the calculated expected number of bristles, and may use equations (1) and (2) above to composite the effects of the bristles on the color and opacity of the destination pixels on the canvas as the bristles sweep over the canvas. In some embodiments, if the direction of brush stroke changes (and/or the orientation of the brush tool changes) during the brush stroke, shown as the positive exit from 1270, the method may include the image editing application re-calculating the expected number of bristles that are expected to overlap given the new conditions. As illustrated in FIG. 12, in this case, the method may include the image editing application repeating the operations illustrated in 1230-1260 (dependent on the new conditions) each time the direction and/or brush orientation change. If the brush stroke and brush tool orientation do not change during the stroke (or once they stop changing), shown as the negative exit from 1270, the image editing application may use the calculated expected number of overlapping bristles to determine the effects of the brush stroke for the duration (or remainder) of the brush stroke. Note that in some embodiments, the expected number of overlapping bristles and the corresponding per-bristle opacity value may only be calculated once for a given brush stroke (e.g., dependent on the initial position and orientation of the brush tool, and on the initial direction and/or arc of the brush stroke) and these values may used to determine the effects of the entire brush stroke, regardless of whether the brush stroke changes direction or the brush tool is re-oriented.

Note that in various embodiments, if one or more brush strokes are used to apply paint of a given color to a blank canvas, or to a blank portion of a canvas on which paint has already been deposited, the resulting color values for the affected pixels may be the same as the color values of the paint being applied, irrespective of the number of overlapping bristles in a single brush stroke, or the number of brush strokes used to apply the paint. However, using the systems and method described herein, while the opacity value of the affected pixels resulting from a single brush stroke may be approximately the same as (or no more than) the target opacity value for the single brush stroke, the resulting opacity value of the affected canvas pixels may change as additional brush strokes are used to apply more paint to those canvas pixels (e.g., as additional coats of paint are applied). Thus, just as with real (physical) painting, the result of applying multiple brush strokes of the same paint on a blank canvas may be that the paint at the bulk of the destination pixels has an effective opacity value higher than that specified for a single brush stroke. Similarly, if one or more coats of paint are deposited over existing (dried) paint that is a different color than the paint being deposited, the result may be that the paint at the destination pixels has an effective opacity value higher than that specified for a single brush stroke of the paint being applied, dependent on the target opacity value and the opacity value of the existing paint. In this case, however, the resulting color values of the destination pixels may reflect the compositing of one paint color over another paint color, as described herein.

Figure 13:
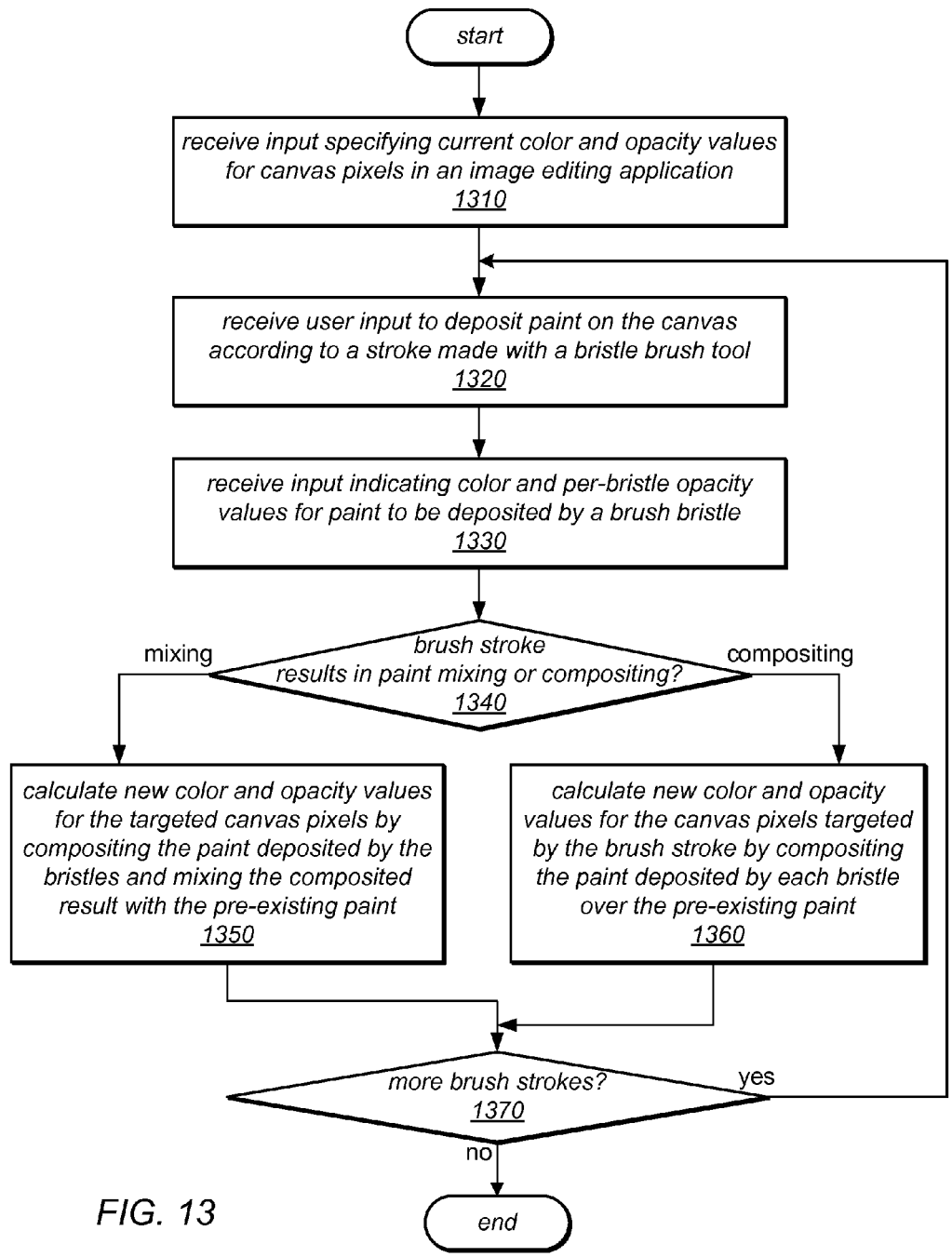
FIG. 13 is a flow diagram illustrating a method for editing an image in an image editing application that calculates a per-bristle opacity value when determining the cumulative effects of a brush stroke, according to one embodiment.

FIG. 13 illustrates a method for editing an image in an image editing application that includes one or more brush tools, and that calculates per-bristle opacity values when determining the effects of brush strokes, according to one embodiment. As illustrated in this example, the method may include the image editing application receiving input specifying current color and opacity values for canvas pixels, as in 1310 (e.g., color and opacity values for pixels of a blank canvas or a canvas on which paint has already been deposited). As illustrated at 1320, the method may include the image editing application receiving user input to deposit paint on the canvas according to a stroke made with a bristle brush tool. As in previous examples, the method may include receiving input indicating color and per-bristle opacity values for paint to be deposited by a brush stroke, as in 1330. As described above, the input may specify a target brush stroke opacity value from which the per-bristle opacity value may be calculated.

As illustrated in FIG. 13, if the brush stroke results in a paint compositing operation (e.g., if the brush stroke is to deposit paint over paint that was previously deposited by another brush stroke, and that has already dried), shown as the right exit from 1340, the method may include the image editing application calculating new color and opacity values for the canvas pixels targeted by the brush stroke by compositing the paint deposited by each bristle over the pre-existing paint, as in 1360. For example, the image editing application may apply equations (1) and (2) to composite the paint deposited by each bristle over the pre-existing paint.

As illustrated in FIG. 13, if the brush stroke results in a paint mixing operation (e.g., if the brush stroke is to deposit paint over previously deposited paint that is still wet), shown as the left exit from 1340, the method may include the image editing application calculating new color and opacity values for the canvas pixels targeted by the brush stroke by compositing the paint deposited by each bristle together and mixing the composited results with the pre-existing wet paint, as in 1350. For example, the image editing application may apply mixing equations, rather than the compositing equations (1) and (2), to mix the paint deposited by each bristle over the pre-existing paint.

As shown in this example, if there are more brush strokes to be applied to the canvas, shown as the positive exit from 1370, the method may include repeating the operations illustrated at 1320-1360 for these additional brush strokes. For example, these additional brush strokes may result in additional paint being composited or mixed with the paint already on the canvas. Once there are no more brush strokes to be applied to the canvas, shown as the negative exit from 1370, the modified image may be stored and/or displayed by the image editing application (not shown).

In some embodiments, performance of the methods described herein may be improved by integrating GPU acceleration for the rasterization and compositing operations described. This may result in a substantial increase in performance, especially when employing models of large brushes (e.g., those having a large footprint and/or a large number of bristles).

Figure 14:
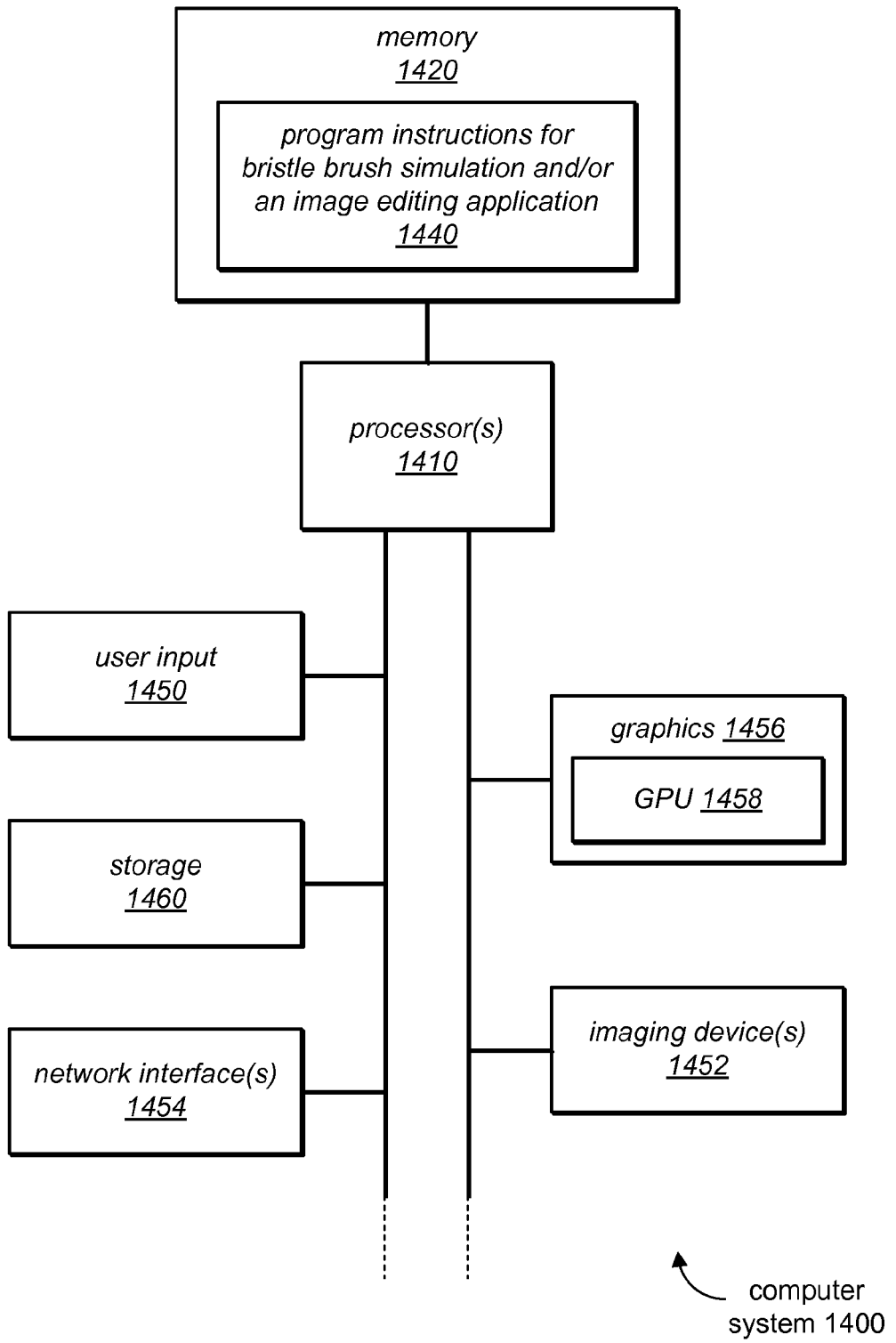
FIG. 14 is a block diagram illustrating constituent elements of a computer system that is configured to implement brush simulation and an image editing application that calculates a per-bristle opacity value when determining the cumulative effects of a brush stroke, according to various embodiments.

The methods described herein for bristle brush simulation and/or an image editing application that calculates a per-bristle opacity value for determining color and opacity values representing the cumulative effect of a brush stroke on destination canvas pixels dependent on a target opacity value for the brush stroke may be performed by a computer system configured to provide the functionality described. FIG. 14 is a block diagram illustrating one embodiment of a computer system 1400 configured to implement such image editing operations (e.g., within an image editing application or any of a variety of graphics applications that provide such image editing functionality, such as painting, publishing, photography, games, animation, and other applications). Computer system 1400 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

The computer system 1400 may include one or more processors 1410 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1400, such as various versions of Unix, Linux, Windows® from Microsoft Corporation, MacOS® from Apple Inc., or any other operating system that enables the operation of software on a hardware platform. The processor(s) 1410 may be coupled to one or more of the other illustrated components, such as a memory 1420, by at least one communications bus.

In one embodiment, program instructions 1440 may be executable by the processor(s) 1410 to implement aspects of the techniques described herein (e.g., program instructions executable to cause computer system 1400 to perform bristle brush simulation and/or other image editing operations in an image editing application that calculates a per-bristle opacity value for determining color and opacity values representing the cumulative effect of a brush stroke on destination canvas pixels dependent on a target opacity value for the brush stroke. For example, program instruction 1440 may include program instructions executable to implement a graphics application that may be configured to perform various image editing functions and to render new images accordingly. In some embodiments, a user may invoke operations to add, move or remove objects, resize objects or entire images, create, remove, or modify colors, texture-maps and/or textures of objects in an image, or otherwise alter an input image through a user interface of a graphics application, and this user interface may include one or more brush tools, each with a respective shape and/or number of bristles, as described herein. In some embodiments, program instructions 1440 may be configured to perform these operations and may employ the methods described herein for performing bristle brush simulation and/or other image editing operations using a color space representation that includes an opacity channel. Program instructions 1440 may be configured to render output images (i.e. images modified by various image editing operations) to a separate window, or directly into the same frame buffer containing the input image, in different embodiments.

In various embodiments, program instructions 1440 may be partly or fully resident within the memory 1420 at the computer system 1400 at any point in time. For example, portions of the digital image editing program 100 and its constituent elements and data (e.g., editing operations 120, brush model 130, and/or brush behavior simulation functionality 140) and/or program instructions executable to perform bristle brush simulation and/or other image editing operations in an image editing application that calculates a per-bristle opacity value from a target brush stroke opacity, as described herein, may be stored in the memory 1420. The memory 1420 may be implemented using any appropriate medium such as any of various types of ROM or RAM (e.g., DRAM, SDRAM, RDRAM, SRAM, etc.), or combinations thereof. The program instructions may also be stored on a storage device 1460 accessible from the processor(s) 1410. Any of a variety of storage devices 1460 may be used to store the program instructions 1440 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1460 may be coupled to the processor(s) 1410 through one or more storage or I/O interfaces. In some embodiments, the program instructions 1440 may be provided to the computer system 1400 via any suitable computer-readable storage medium including the memory 1420 and storage devices 1460 described above.

In one embodiment, a specialized graphics card or other graphics component 1456 may be coupled to the processor(s) 1410. The graphics component 1456 may include a graphics processing unit (GPU) 1458. A GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. In some embodiments, program instructions 1440 may utilize GPU 1458 when rendering or displaying images, and/or to accelerate other operations that are suitable for parallel processing, according to various embodiments. For example, GPU 1458 may implement a number of graphics primitive operations in a way that makes executing them much faster than drawing directly to the screen with CPU 1410. In other embodiments, the methods disclosed herein for simulating brush behavior, and/or for determining and compositing the effects of the individual bristles of a brush tool may be implemented by program instructions configured for parallel execution on one or more such GPUs. The GPU 1458 may implement one or more application programmer interfaces (APIs) that permit programmers to invoke the functionality of the GPU. Suitable GPUs may be commercially available from vendors such as NVIDIA Corporation, ATI Technologies, and others. In some embodiments, at least a portion of program instructions 1440 may be provided to GPU 1458 for performing image editing operations (or portions thereof) on GPU 1458 using one or more of the techniques described herein. In some embodiments, the techniques described herein may be implemented by a combination of program instructions 1440 executed on one or more processors 1410 and one or more GPUs 1458, respectively. Program instructions 1440 may also be stored on an external storage device (such as storage 1460) accessible by the processor(s) 1410 and/or GPU 1458, in some embodiments.

In some embodiments, computer system 1400 may include one or more imaging devices 1452. The one or more imaging devices 1452 may include various types of raster-based imaging devices such as monitors and printers. In one embodiment, one or more display devices 1452 may be coupled to the graphics component 1456 for display of data provided by the graphics component 1456. The computer system 1400 may also include one or more additional I/O interfaces, such as interfaces for one or more user input devices 1450. In addition, the computer system 1400 may include one or more network interfaces 1454 providing access to a network. It should be noted that one or more components of the computer system 1400 may be located remotely and accessed via the network. The program instructions 1440 may be implemented in various embodiments using any desired programming language, scripting language, or combination of programming languages and/or scripting languages, e.g., C, C++, C#, Java™, Perl, etc. The computer system 1400 may also include numerous elements not shown in FIG. 14, as illustrated by the ellipsis.

In various embodiments, the elements shown in various flow diagrams (e.g., FIGS. 6, 7, 8, 12, and 13) may be performed in a different order than the illustrated order. In these figures, any of the operations described in the elements may be performed programmatically (i.e., by a computer according to a computer program). In these figures, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
    using a computer to perform:
        receiving input representing a brush stroke made by a brush tool of an image editing program sweeping across a canvas, wherein the brush tool comprises a plurality of bristles;
        receiving input specifying a target opacity value for paint to be deposited on the canvas by the brush stroke;
        generating per-pixel data for each canvas pixel affected by the brush stroke reflecting the effects of the brush stroke on the canvas pixel, wherein the per-pixel data for each canvas pixel comprises a respective opacity value and one or more respective color values; and
        storing the per-pixel data in a representation of an image on the canvas, as modified by the brush stroke;
    wherein said generating comprises:
        computing a per-bristle opacity value dependent on the number of bristles in the brush tool and dependent on the target opacity value for the brush stroke; and
        determining an effect of each bristle of the brush tool on the color and opacity values of each canvas pixel affected by the brush stroke dependent on the per-bristle opacity.

2. The method of claim 1,
    wherein said generating further comprises, for each bristle, determining a path of canvas pixels along which the bristle has swept; and wherein said determining an effect of each bristle comprises determining the effect of each bristle on the color and opacity values of the canvas pixels in its path.

3. The method of claim 1, wherein said generating further comprises:
compositing the determined effects of each bristle at each canvas pixel affected by the brush stroke to determine the respective opacity value and the one or more respective color values.

4. The method of claim 1, wherein said computing the per-bristle opacity value is further dependent on one or more of: a type of the brush tool, a shape of the brush tool, an average number of bristles whose paths are expected to overlap during the brush stroke, or a mode of the number of bristles whose paths are expected to overlap at each canvas pixel affected by the brush stroke.

5. The method of claim 1, wherein said computing the per-bristle opacity value is further dependent on one or more of: an initial orientation of the brush tool, an initial position of the brush tool, an initial direction of the brush stroke, an initial arc swept by the brush stroke, or a pressure applied to the brush tool.

6. The method of claim 1, wherein said computing the per-bristle opacity value comprises computing an exponential function of the target opacity value in which the exponent is the reciprocal of a number of bristles whose paths are expected to overlap during the brush stroke.

7. The method of claim 1, wherein the opacity value of the paint cumulatively deposited by the brush stroke at any canvas pixel affected by the brush stroke is no higher than the target opacity value.

8. The method of claim 1,
wherein said generating further comprises: computing a new per-bristle opacity value during the brush stroke dependent on one or more of: a change in the orientation of the brush tool, a change in the position or the brush tool, a change in the direction of the brush stroke, a change in the arc swept by the brush stroke, or a change in pressure applied to the brush tool; and
wherein said determining the effect of each bristle of the brush tool on the color and opacity values of canvas pixel affected by the brush stroke subsequent to the change in the orientation of the brush tool, the change in the position or the brush tool, the change in the direction of the brush stroke, the change in the arc swept by the brush stroke, or the change in pressure applied to the brush tool is dependent on the new per-bristle opacity value.

9. A computer-readable storage medium, storing program instructions that when executed on one or more computers cause the one or more computers to perform:
receiving input representing a brush stroke made by a brush tool of an image editing program sweeping across a canvas, wherein the brush tool comprises a plurality of bristles;
receiving input specifying a target opacity value for paint to be deposited on the canvas by the brush stroke;
generating per-pixel data for each canvas pixel affected by the brush stroke reflecting the effects of the brush stroke on the canvas pixel, wherein the per-pixel data for each canvas pixel comprises a respective opacity value and one or more respective color values; and
storing the per-pixel data in a representation of an image on the canvas, as modified by the brush stroke;
wherein said generating comprises:
computing a per-bristle opacity value dependent on the number of bristles in the brush tool and dependent on the target opacity value for the brush stroke; and
determining an effect of each bristle of the brush tool on the color and opacity values of each canvas pixel affected by the brush stroke dependent on the per-bristle opacity.

10. The storage medium of claim 9,
wherein said generating further comprises, for each bristle, determining a path of canvas pixels along which the bristle has swept; and
wherein said determining an effect of each bristle comprises determining the effect of each bristle on the color and opacity values of the canvas pixels in its path.

11. The storage medium of claim 9, wherein said generating further comprises:
compositing the determined effects of each bristle at each canvas pixel affected by the brush stroke to determine the respective opacity value and the one or more respective color values.

12. The storage medium of claim 9, wherein said computing the per-bristle opacity value is further dependent on one or more of: a type of the brush tool, a shape of the brush tool, an average number of bristles whose paths are expected to overlap during the brush stroke, or a mode of the number of bristles whose paths are expected to overlap at each canvas pixel affected by the brush stroke, an initial orientation of the brush tool, an initial position of the brush tool, an initial direction of the brush stroke, an initial arc swept by the brush stroke, or a pressure applied to the brush tool.

13. The storage medium of claim 9, wherein said computing the per-bristle opacity value comprises computing an exponential function of the target opacity value in which the exponent is the reciprocal of a number of bristles whose paths are expected to overlap during the brush stroke.

14. The storage medium of claim 9, wherein the opacity value of the paint cumulatively deposited by the brush stroke at any canvas pixel affected by the brush stroke is no higher than the target opacity value.

15. A system, comprising:
one or more processors; and
a memory coupled to the one or more processors, wherein the memory stores program instructions that when executed by the one or more processors cause the one or more processors to perform:
receiving input representing a brush stroke made by a brush tool of an image editing program sweeping across a canvas, wherein the brush tool comprises a plurality of bristles;
receiving input specifying a target opacity value for paint to be deposited on the canvas by the brush stroke;
generating per-pixel data for each canvas pixel affected by the brush stroke reflecting the effects of the brush stroke on the canvas pixel, wherein the per-pixel data for each canvas pixel comprises a respective opacity value and one or more respective color values; and
storing the per-pixel data in a representation of an image on the canvas, as modified by the brush stroke;
wherein said generating comprises:
computing a per-bristle opacity value dependent on the number of bristles in the brush tool and dependent on the target opacity value for the brush stroke; and
determining an effect of each bristle of the brush tool on the color and opacity values of each canvas pixel affected by the brush stroke dependent on the per-bristle opacity.

16. The system of claim 15,
wherein said generating further comprises, for each bristle, determining a path of canvas pixels along which the bristle has swept; and
wherein said determining an effect of each bristle comprises determining the effect of each bristle on the color and opacity values of the canvas pixels in its path.

17. The system of claim 15, wherein said generating further comprises:
compositing the determined effects of each bristle at each canvas pixel affected by the brush stroke to determine the respective opacity value and the one or more respective color values.

18. The system of claim 15, wherein said computing the per-bristle opacity value is further dependent on one or more of: a type of the brush tool, a shape of the brush tool, an average number of bristles whose paths are expected to overlap during the brush stroke, or a mode of the number of bristles whose paths are expected to overlap at each canvas pixel affected by the brush stroke, an initial orientation of the brush tool, an initial position of the brush tool, an initial direction of the brush stroke, an initial arc swept by the brush stroke, or a pressure applied to the brush tool.

19. The system of claim 15, wherein said computing the per-bristle opacity value comprises computing an exponential function of the target opacity value in which the exponent is the reciprocal of a number of bristles whose paths are expected to overlap during the brush stroke.

20. The system of claim 15, wherein the opacity value of the paint cumulatively deposited by the brush stroke at any canvas pixel affected by the brush stroke is no higher than the target opacity value.

* * * * *

UNITED STATES PATENT AND TRADEMARK OFFICE
CERTIFICATE OF CORRECTION

PATENT NO. : 8,379,047 B1
APPLICATION NO. : 12/790560
DATED : February 19, 2013
INVENTOR(S) : Stephen J. DiVerdi Page 1 of 1

It is certified that error appears in the above-identified patent and that said Letters Patent is hereby corrected as shown below:

In the Claims

Column 21, Line 36, delete "or" and insert -- of -- between "…in the position" and "the brush…", therefor.

Column 21, Line 44, delete "or" and insert -- of -- between "…position" and "the brush tool,…", therefor.

Signed and Sealed this
Seventeenth Day of September, 2013

Teresa Stanek Rea
*Deputy Director of the United States Patent and Trademark Office*